(12) United States Patent
Pendharkar et al.

(10) Patent No.: US 8,560,801 B1
(45) Date of Patent: Oct. 15, 2013

(54) TIERING AWARE DATA DEFRAGMENTATION

(75) Inventors: Niranjan Pendharkar, Pune (IN); Ashish Karnik, Pune (IN)

(73) Assignee: Symantec Corporation, Mountain View, CA (US)

( * ) Notice: Subject to any disclaimer, the term of this patent is extended or adjusted under 35 U.S.C. 154(b) by 370 days.

(21) Appl. No.: 13/081,685

(22) Filed: Apr. 7, 2011

(51) Int. Cl.
*G06F 12/00* (2006.01)
(52) U.S. Cl.
USPC ............ 711/170; 711/153; 711/158; 711/173
(58) Field of Classification Search
USPC .......................... 711/151, 153, 158, 170, 173
See application file for complete search history.

(56) References Cited

U.S. PATENT DOCUMENTS

| | | | |
|---|---|---|---|
| 8,001,352 B1* | 8/2011 | Chatterjee et al. | 711/165 |
| 8,316,202 B1* | 11/2012 | Chatterjee et al. | 711/165 |
| 2012/0072656 A1* | 3/2012 | Archak et al. | 711/104 |
| 2012/0198152 A1* | 8/2012 | Terry et al. | 711/114 |
| 2012/0246403 A1* | 9/2012 | McHale et al. | 711/114 |

* cited by examiner

*Primary Examiner* — John Lane
(74) *Attorney, Agent, or Firm* — Campbell Stephenson LLP (57) ABSTRACT

Various systems and methods for performing tiering-aware data defragmentation. One method can involve receiving tiering information from a storage device that comprises multiple tiers. The information specifies a tiering attribute and tiering attribute value for the tiers. The method involves establishing zones that have zone attribute values corresponding to the received tiering attribute values. The method then involves storing a given block in a particular zone in response to detecting that a block attribute value of the block corresponds to a zone attribute value for the zone.

20 Claims, 4 Drawing Sheets

TIERING AWARE DATA DEFRAGMENTATION

FIELD OF THE INVENTION

This invention relates to organization of data and, more particularly, to defragmentation of data stored in a storage array.

DESCRIPTION OF THE RELATED ART

Storage arrays provide multiple types of storage. The various types of storage are known as tiers. Each tier has a set of characteristics, such as access time, cost, type of storage device, and the like. Generally, higher tiers in a storage array have more desirable operating characteristics, such as low latency, or high reliability. Storage devices included in higher tiers are often more expensive storage devices than those used in lower tiers. For example, a higher tier of an array may use a solid state drive, which is relatively expensive, to store data while a lower tier may use a tape drive, which is relatively inexpensive, to store data. Given that storage in higher tiers is generally more expensive than storage in lower tiers, it is common to store more important data in higher tiers and less important data in lower tiers.

A storage array can measure the importance of data and move more important data to higher tiers and less important data to lower tiers. This is known as data tiering. For example, a storage array can detect how frequently data is accessed and move more frequently accessed data to higher tiers and less frequently accessed data to lower tiers. Frequency of access is one measure of how important data is. Data that is accessed frequently is considered more important than data that is less frequently accessed. Storage arrays typically organize data into physical portions, or chunks. The storage array is responsible for organizing chunks into appropriate tiers. For example, if a particular chunk contains important data, the storage array can move the chunk to a higher tier in the storage array. If a chunk contains less important data, the storage array can move the chunk to a lower tier in the storage array.

Storage arrays provide one level of abstraction related to data storage. Usually, storage arrays are considered a physical layer, with data organized according to physical associations, e.g., chunks. Another level of abstraction is a logical layer provided by file systems. File systems organize data according to logical associations, e.g., files. All the data in a given file is said to be logically associated since all the data belongs to the same file. Storage arrays and file systems can refer to the same set of data, but the way file systems organize and address the data differs from the way storage arrays organize and address the data.

File systems write data to storage arrays, but are generally unaware of the policies used by the storage arrays to manage the chunks in the storage arrays. This lack of awareness can lead to inefficient utilization of storage space in the storage arrays. For example, a file system can write data from two files to the same chunk in the storage array, one of the files having frequently accessed data and the other having infrequently accessed data. When the storage array moves the infrequently accessed data to a lower tier, the frequently accessed data in the same chunk is also moved to the lower tier. Or, if the storage array maintains frequently accessed data in a higher tier, infrequently accessed data in the same chunk is also maintained in the higher tier. This negatively impacts the storage array's objective of having the most important, e.g., the most frequently accessed, data in higher tiers and the least important, e.g., the least frequently accessed, data in lower tiers.

SUMMARY OF THE INVENTION

Various systems and methods for performing tiering-aware data defragmentation are disclosed. For example, one method can involve receiving tiering information from a storage device that comprises multiple tiers. The information specifies a tiering attribute and tiering attribute value for the tiers. The method involves establishing zones that have zone attribute values corresponding to the received tiering attribute values. The method then involves storing a given block in a particular zone in response to detecting that a block attribute value of the block corresponds to a zone attribute value for the zone.

In an embodiment, the tiering attribute value comprises a threshold value. In response to detecting that the number of accesses to a block has passed a threshold value, the method involves changing a block attribute value of the block. The block attribute value can be based on the tiering information. In one example, the tiering attribute value can be related to data priority.

In one embodiment, each block in a zone has the same block attribute value as the other blocks in the zone. The method can involve moving a block from a first zone to a second zone. The method can also involve communicating a command to the storage device, where the command overrides a tiering policy of the storage device.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A file system is configured to receive information regarding tiering layout and operations from a storage array that performs the tiering operations. The file system can use this information to reduce performance impacts and to facilitate effective utilization of high coast storage tiers that might otherwise arise during tiering operations. One way the file system achieves this is by monitoring tiering criteria associated with portions of data. The file system can arrange data such that data having similar characteristics, as the characteristics relate to tiering operations, is t co-located on the chunks in the storage array, rather than scattered across multiple non-contiguous locations of a storage object. Further, the file system can avoid arranging data having different characteristics on the same chunk in the storage array.

Figure 1:
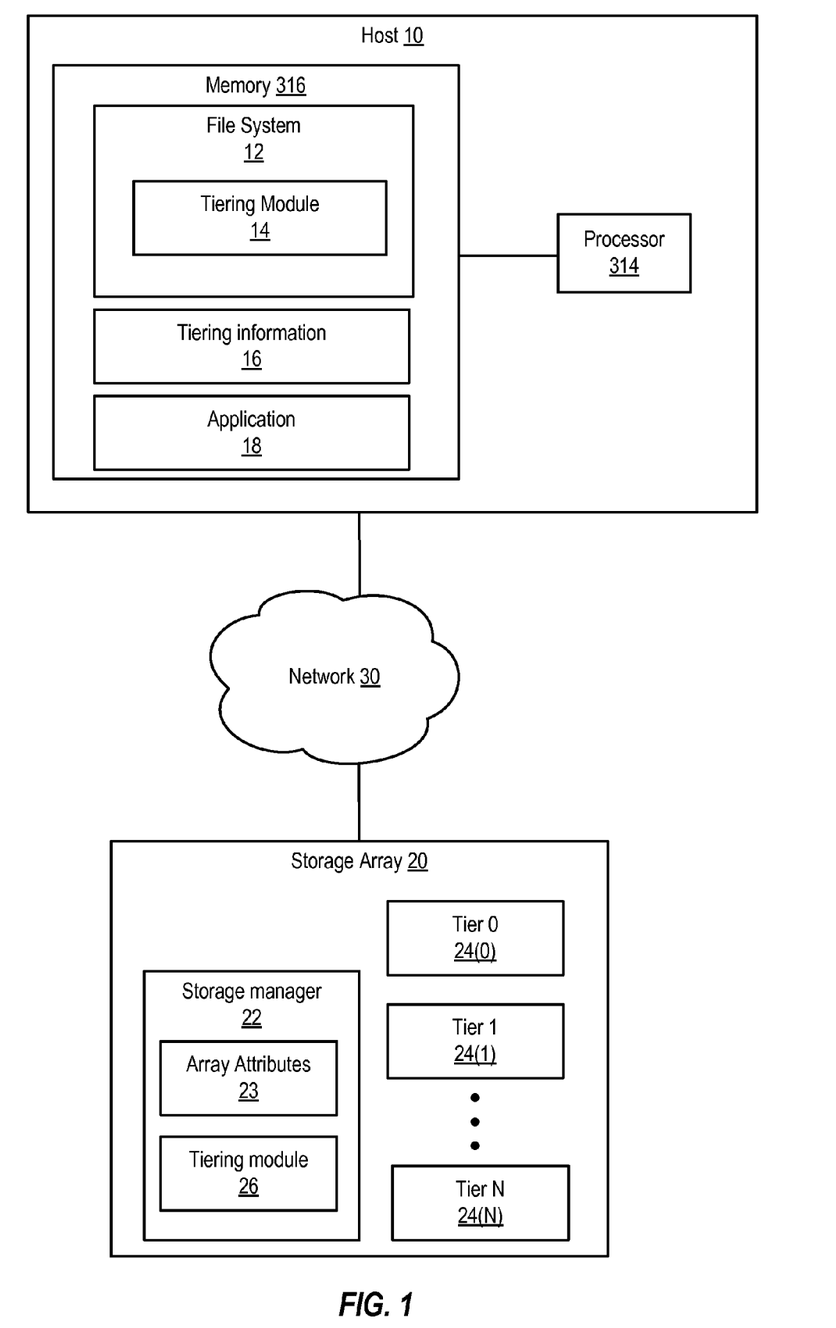
FIG. 1 is a block diagram of a system that performs tiering-aware data defragmentation, according to one embodiment of the present invention.

FIG. 1 is a block diagram of a computing system. As shown, the computing system includes a host 10 and a storage array 20, coupled by a network 30. Network 30 can include a WAN (Wide Area Network), such as the Internet, one or more LANs (Local Area Networks), and/or one or more SANs (Storage Area Networks). In an embodiment, host 10 can include and/or be coupled (e.g., via a bus, network, or other appropriate interconnect) to storage array 20. Host 10 is a computing device such as a personal computer, laptop computer, server, personal digital assistant, cell phone, or the like. Host 10 includes at least one processor 314 and a memory 316.

Memory 316 stores program instructions executable by processor 314 to implement a file system 12, which includes a tiering module 14. Memory 316 also stores tiering information 16 and an application 18. Tiering module 14 can interact with storage manager 22, in particular tiering module 26, to enhance tiering operations performed by storage array 20.

Application 18 can be a word processing program, email program, graphic editing program, database application, or the like. Application 18 accesses (e.g., by generating and/or consuming) data on storage array 20.

Storage array 20 provides persistent data storage, such that data stored in storage array 20 will remain stored even after storage array 20 is powered off. Storage array 20 can include one or more storage devices or storage appliances such as, for example, a solid state drive, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage array 20 can also include one or more types of storage media, including solid state media (e.g., flash drives), optical media (e.g., CDs and DVDs), and magnetic media (e.g., hard disks or magnetic tape). In an embodiment, storage array 20 can be implemented using cloud storage, in which storage array 20 is a logical storage device to which physical storage device(s) are allocated on an as-needed and/or as-contracted basis.

The data stored in storage array 20 is divided into groupings of data known as chunks. A chunk is a portion of data stored at a range of typically contiguous addresses in a single tier. A chunk is the smallest unit of data that storage manager 22 operates on. For example, storage manager 22 can view a 1 gigabyte (Gb) hard disk in storage array 20 as 1000 chunks having size 1 megabyte (Mb). The chunks can be sequentially numbered from 1 to 1000 and can correspond to physical addresses on the hard disk. For example, chunk 1 can include the first 1 Mb of data stored in the hard disk, e.g., at the first 1 million single byte addresses, chunk 2 can include the second 1 Mb of data stored in the hard disk, and so on. In an embodiment, the size of chunks is a configurable attribute of storage array 20 and is included in array attributes 23. An administrator can specify chunk size for the storage array such that storage manager 22 can manipulate data at a coarser or finer level of granularity.

Storage array 20 is divided into multiple tiers 24(0) through 24(N), where N is an integer greater than or equal to two and indicates the number of tiers in storage array 20. Each tier can be composed of one or more homogenous storage devices of a different type than those in the other tiers, e.g., tier 24(0) can include exclusively solid state drives and tier 24(1) can include exclusively hard disks. Tiers can also be organized based on one or more performance characteristics. For example, tier 24(0) can include storage devices that are relatively high speed, and tier 24(1) can include storage devices that are relatively low speed. For example, tier 24(0) can include high speed hard drives, e.g., newer technology, and tier 24(1) can include lower speed hard drives, e.g., older technology. In an embodiment, each tier can include multiple types of storage devices.

Storage manager 22 provides storage management functions. Tiering module 26 performs tiering operations. A tiering operation refers to organizing chunks into tiers based upon one or more policies included in array attributes 23. Array attributes 23 can be specified by an array vendor or can be configured by a user such as an administrator. Array attributes 23 include a specification of the chunk size used by the array. Array attributes 23 also include policies that specify the criteria for moving data between tiers, which is also known as performing tiering operations. For example, array attributes 23 can specify that access frequency (also known as temperature) of a chunk is the criterion which is determinative of which tier the chunk belongs in. That is, a policy can specify that which tier a chunk is stored in depends upon how frequently file system 12 accesses data in the chunk. Array attributes can specify a range of temperature for the chunks in each tier, such as if data is accessed more frequently than once a week, store the data in tier 1. If the data is accessed less frequently than once a week, but more frequently than once a month, store the data in tier 2, and so on.

Tiering module 26 can monitor the I/O temperature of chunks and move them to the appropriate tier when an I/O temperature threshold is crossed, such as access frequency increasing to more than once a week. For example, when file system 12 accesses data in a chunk, either reading or writing to the chunk, tiering module 26 records an indication that the chunk was accessed. Tiering module 26 calculates temperature by tracking the number of accesses to a chunk over a specified time period. Tiering module 26 can also distinguish between the type of access, e.g., read or write. Tiering policies can specify different behavior for different types of access and tiering module 26 can perform different tiering operations based on the types of access.

Array attributes 23 can include various other tiering criteria, such as priority of a chunk. For example, storage manager can monitor an attribute, such as a register value, for each chunk that indicates the chunk's priority and move the chunk in response to detecting a change in the value. The value can be specified by a user, for example, a user of application 18. Another example of a tiering criterion is age of a file. This can refer to the time since the file was created by an application or the time since the file was previously accessed. Array attributes 23 can specify a policy that chunks less than a week old should be stored in tier 1, more than a week old but less than a month old in tier 2, and so on. Another example of a tiering criterion is the confidentiality of a chunk. For example, a policy can specify that confidential data should never be stored in a given tier, e.g., a tier that utilizes cloud storage. The above are merely examples. Tiering policies can be specified based on a wide range of factors related to goals and objectives of an enterprise. Tiering policies can be monitored and changed, e.g., based on effective utilization of storage or based on changed enterprise objectives. For example, an administrator can specify that a temperature or age threshold should be modified.

Tiering module 26 monitors the chunks in storage array 20 and implements tiering policies based on array attributes 23. When tiering module 26 detects that a threshold associated with a criterion has been met for a given chunk, tiering module 26 initiates a tiering operation for the chunk. This can involve copying the data stored in the chunk to another tier. In an embodiment, tiering module 26 performs tiering operations on a periodic basis. In such embodiments, tiering module 26 tracks chunks that need to be moved to a different tier. This can involve keeping a list of chunks that need to be moved and the source and destination tiers for the chunks, or any other suitable mechanism for tracking and describing pending tiering operations. For example, tiering module 26 can detect chunks that need to be moved and add the chunks to a list. Alternatively, once each period, tiering module 26 can scan one or more chunks to detect whether the chunks need to be moved, e.g., an attribute associated with the chunks indicates that the chunks should be in a different tier, and add those chunks to a list. Then, on a periodic basis, tiering module 26 can move all the chunks on the list from source tiers to destination tiers. Tiering module 26 can also perform tiering operations on a non-periodic basis, e.g., in response to detection of a threshold condition such as disk utilization reaching a specified percentage of capacity.

Tiering module 26 also communicates with file system 12. Tiering module 26 sends information regarding array attributes 23 to file system 12. This can be done in response to a change to array attributes 23, on a periodic basis, and/or in response to a request by file system 12 for the information. Tiering module 26 can also receive information from file system 12. File system 12 can send information to storage manager that certain operations should not be considered by tiering module 26 in making tiering decisions. For example, file system 12 may access data in a chunk for purposes other than because an application has requested a read or write to the chunk, e.g., because of a virus scan or other administrative function. In such a case, file system 12 can instruct storage manager to ignore the access when tiering module 26 calculates the access frequency for the chunk. That is, file system 12 can instruct tiering module 26 to not consider certain accesses to a chunk when calculating the chunk's temperature, thus overriding storage manager 22's policy driven behavior.

File system 12 stores, in tiering information 16, array attribute information received from storage manager 22. File system 12 uses tiering information 16 to modify operations, perform operations, or avoid performing tiering operations in order to improve the effectiveness of tiering operations performed by tiering module 26. In particular, file system 12 uses tiering information 16 to detect which tier data belongs to. File system 12 then consolidates data that belongs to the same tier into regions known as zones. The zones contain only data that belongs to the same tier.

File system 12 maintains a logical view of storage array 20. File system 12 can view storage array 20 as one or more logical unit numbers (LUNs). A LUN can include storage locations in multiple tiers. File system 12 maintains mapping information that shows each LUN divided into blocks and zones. A block is the smallest portion of data file system 12 operates on. The mapping info indicates which files have data stored in which blocks. File system 12 also maintains logical-to-physical mapping information that indicates which physical addresses in storage array 20 each block is mapped to. A zone is an area of the LUN that blocks that belong to the same tier are stored in. While file system 12 is discussed throughout this disclosure as a file system, in an embodiment, file system 12 can be implemented as another type of application that maintains a logical view of data stored in storage array 20, e.g., a database.

Application 18 operates on files. Application 18 issues commands to file system 12 to read or write to the files. Application 18 can pass a file name and data modifications to file system 12 along with the command to read or write the file. For a given file passed to file system 12 by application 18, file system 12 identifies blocks that contain data for the file and either returns requested data from the blocks to application 18 (in the case of a read) or stores data specified by application 18 to the blocks (in the case of a write).

Tiering module 14 monitors one or more tiering attribute values for one or more blocks in the LUN. In an embodiment, tiering module 14 detects read or write access to blocks. Tiering module 14 tracks the access to blocks and calculates an access frequency, or temperature, for each block that is accessed. Tiering module 14 compares the temperature for a block with one or more values stored in tiering information 16 and detects which tier the block belongs to.

In an alternative embodiment, tiering module 14 uses other information to detect which tier a block belongs to. In one example, tiering module 14 detects that a block is high-priority, e.g., by detecting the value of a priority flag associated with the block or a file to which the block belongs. Tiering module then detects, based on tiering information 16, which tier the high-priority block belongs to. In another embodiment, tiering module compares the age of a block with a threshold age specified in tiering information 16. Tiering module 14 detects the correct tier for the block based on the comparison. Age of a block can refer to time since the block was first written to or time since the block was last accessed.

In response to receiving, e.g., from application 18, a first request to write a file, file system 12 selects which blocks to store the file data in based on tiering information 16. In an embodiment, tiering information 16 specifies that new data be stored in a higher tier. Tiering module 14 maintains a list of blocks in the LUN and the tier each block is stored in and should be stored in for each block. In an embodiment, tiering module 14 sets an attribute for each block, e.g., a value in a register. In the case of a first write to a block, tiering module 14 sets an attribute for the block based upon which tier the block should be stored in. For example, tiering module 14 can set a value of 1 in an entry in the list corresponding to the block. The value of 1 can indicate that the block should be stored in tier 1 in storage array 20.

File system 12 detects which tier a block belongs to, based on information generated by tiering module 14. File system 12 also detects, from tiering information 16, the size of a chunk in each tier in storage array 20. Each tier may operate on chunks of identical size. Based on this information, file system 12 stores blocks belonging to the same tier such that the blocks are stored in contiguous regions in storage array 20, where the regions are the same size as the chunk size used by storage array 20. Alternatively, the regions can have a size that is a multiple of the chunk size used by storage array 20. Each region is known as a zone. In an embodiment, file system 12 performs a first-time write to a block such that the block is included in a chunk-sized zone of blocks belonging to the same tier as the block being written.

Alternatively, file system 12 can move a block from one location to another in response to detecting that the block is not stored in a chunk-sized zone of data belonging to the same tier as the block. For example, file system 12 can perform a scan that involves checking an attribute of one or more blocks in the LUN to detect which tier each block belongs to. File system 12 can also maintain a list of zones for each tier and whether each zone is full or has room for additional blocks. If file system 12 detects, e.g., during a scan, that a block should be moved to a zone corresponding to a different tier than the zone the block is currently located in, file system 12 can move the block and update the list. In an embodiment, when file system 12 moves a block from one zone to another, file system 12 instructs tiering module 26 to ignore the move operation when tiering module 26 calculates the temperature of the chunk the block belongs to. In an embodiment, when file system 12 copies a block from one zone to another, file system 12 initiates a read operation of the block, which causes a read of the chunk in storage array 20 that the block is stored in. File system 12 then initiates a write operation of the block to the new zone, which initiates (immediately or after a specified time delay) a write operation to a new chunk in storage array 20. File system 12 can instruct tiering module 26 to ignore the read access and write access when computing the temperature of the blocks as the read and write were performed for administrative purposes, and not directed by application 18.

If there is no available space in a zone for data that belongs to the tier of the block, e.g., all zones for a given tier are full or no zones have been designated for the tier, file system 12 establishes a zone that corresponds to the tier. This can involve allocating an amount of storage equal to the chunk size, or multiple thereof, and reserving the storage for blocks corresponding to the tier. Alternatively, file system 12 can specify a beginning address to store blocks for the tier.

File system 12 keeps track of which zones of the LUN correspond to which tiers of storage array 20. This allows file system 12 to store blocks in zones such that only blocks having the specified tiering attribute values are stored in a single chunk in storage array 20. In an embodiment, file system 12 maintains a list that identifies tiers in storage array 20, which zones of the LUN correspond to which tiers, and which blocks are stored in the zones. This list can include block number and a file name that the block belongs to for each block.

Without the cooperation between file system 12 and storage array 20, the effectiveness of tiering operations would likely be reduced. When storage manager 22 moves a chunk, all data in the chunk is moved. For example, if the storage manager detects that a given 1 Mb chunk is accessed frequently enough to merit transfer to a higher tier, the entire 1 Mb chunk is moved. However, the access may be to only a subset of the chunk. For example, a file system may perform frequent reads to a 0.1 Mb portion of the chunk. However, since the storage manager only operates on 1 Mb chunks, when the storage manager detects that the chunk is being frequently accessed and should be moved to a different tier, the entire 1 Mb chunk (comprising 0.1 Mb of frequently read data and 0.9 Mb of infrequently read data) is moved. This results in the higher tier storing 0.1 Mb of frequently accessed data for which the higher tier is intended, but 0.9 Mb of infrequently accessed data which would be more appropriately stored in a lower tier. The fact that file system 14 and storage array 20 may not operate on the same granular organization of data is a limitation of conventional tiering in storage arrays. This limitation results in diminished effectiveness of tiering. Ideally, for the example above, only the frequently accessed data would be included in the higher tier.

Making file system 12 aware of the underlying organization of chunks that the storage array uses to store the data of the file by transferring that information from storage manager 22 to file system 12 can help to improve tiering efficiency. Likewise, transferring any tiering policies storage array 20 may implement also helps improve tiering efficiency by allowing file system 12 to perform I/O operations in a manner that enhances the effectiveness of tiering operations performed by storage array 20. For example, file system 12 may write more important data that belongs to a first tier to a given chunk and less important data that belongs to a second tier to a different chunk.

Figure 2:
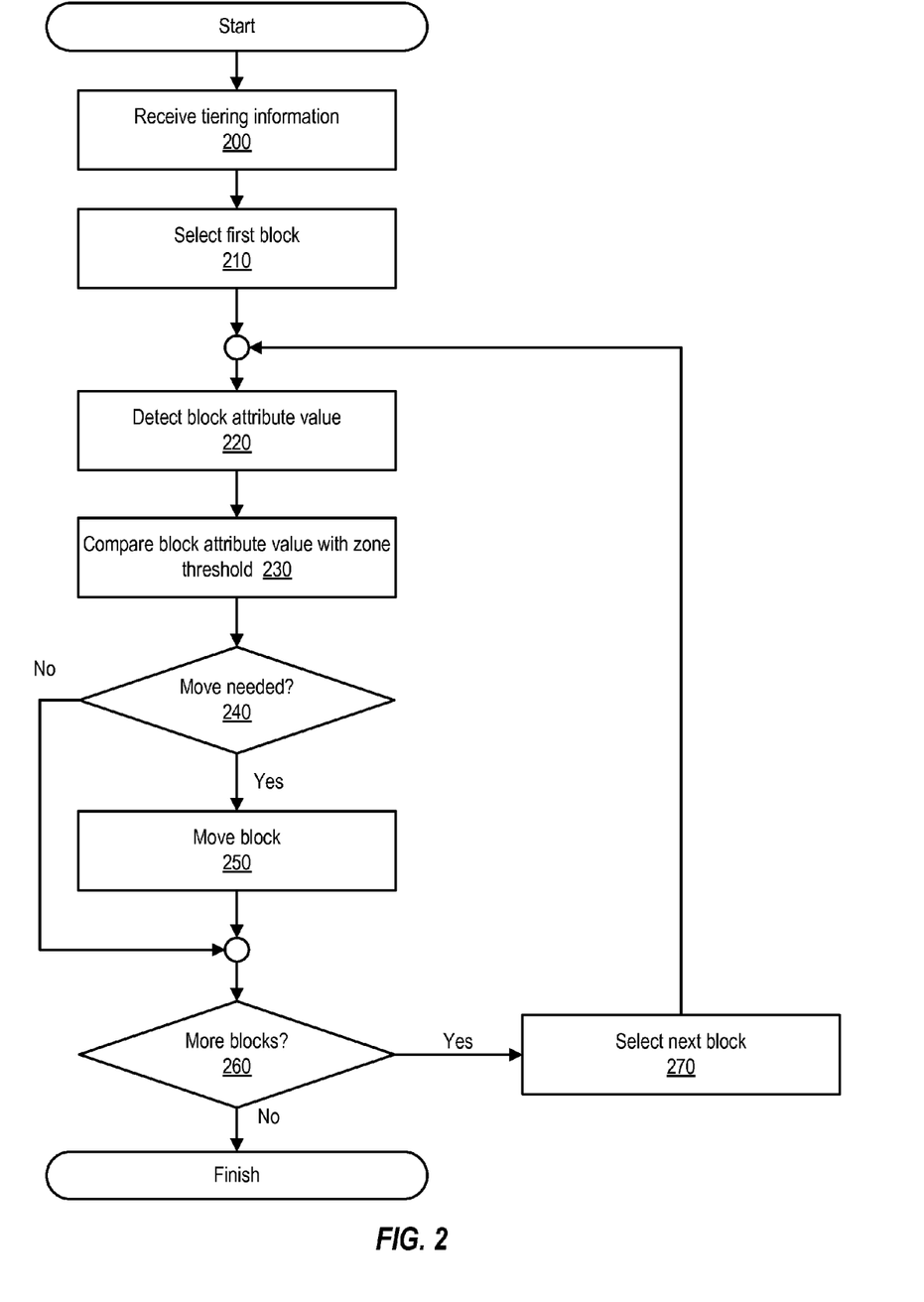
FIG. 2 is a flowchart of a method of performing tiering-aware data defragmentation, according to one embodiment of the present invention.

FIG. 2 is a flowchart of a method of defragmenting data. This method can be performed by a computing device that implements a tiering module, such as tiering module 14 of FIG. 1. This method can be performed in response to a file system, such as file system 12 of FIG. 1, receiving an I/O command, such as a read or write operation. In an embodiment, the method is performed as a result of the occurrence of a threshold condition. For example, the file system can initiate a defragmentation operation in response to detecting that a specified amount of time has passed since a previous defragmentation operation was been performed. Other examples include the file system detecting a specific amount of data written, a volume utilization threshold being attained, a level of fragmentation being exceeded, and the like. The file system can perform the defragmentation operation on a portion of a LUN, on an entire LUN, or on multiple LUNs, e.g., a group of LUNs.

The method begins at 200, where the file system receives tiering information, such as tiering information 16 of FIG. 1. In an embodiment, the tiering information is received from a storage manager, such as storage manager 22 of FIG. 1. The tiering information can include various policies used by the storage manager to perform tiering operations in a storage array, such as storage array 20 of FIG. 1. The tiering information can include information specifying the number of tiers, chunk size used by the tiers, performance characteristics of the tiers, and attributes and threshold values for determining the characteristics of data stored in each tier. For example, the tiering information can indicate that the storage array includes three tiers, such as tiers 24 in FIG. 1. The information can specify, for example, that data that is less than one week old should be stored in a first tier, data between one week and one month old should be stored in tier 2, and data older than one month should be stored in a third tier. The tiering information thus specifies a policy that indicates that if the storage manager detects that the age of a piece of data stored in tier 1 is greater than one week but less than one month, the data should be moved to tier 2. The tiering attribute in the above example is age. Tiering operations are performed based upon age of data. As a result of receiving this information, the file system can organize and/or reorganize blocks such that the policies embodied in the information are more effectively implemented. This is one example, and other types of criteria can exist, such as access frequency, priority, and confidentiality, to name a few.

The file system selects a block at 210. The block can be, for example, the first block in a LUN, the first block in a zone, the first block in a file, the first block targeted by a read or write access operation, or an arbitrary block specified by an administrator.

At 220, the tiering module detects a block attribute value of the block. The block attribute value indicates whether a tiering criteria threshold has been reached. For example, if the tiering information specifies that data is to be moved from tier to tier based on access frequency, the tiering module can detect a value associated with the block that identifies how frequently the block has been accessed. The tiering module also detects which zone the block is in and detects the tiering policies applicable to that zone. In an embodiment, the tiering module maintains information indicating attribute values for one or more blocks in the LUN.

The tiering module also maintains information identifying a zone attribute value for each zone. A zone attribute value can indicate a threshold value of a tiering attribute. A block whose block attribute value passes the threshold can be stored in the zone. For example, if a block's temperature value exceeds a threshold value for its current zone, the block can be moved into a different zone. For example, the block can be moved to a zone that stores blocks that should be stored in a specified tier in the storage array, based on the temperature of the blocks having exceeded the threshold value.

The tiering module compares the block's attribute value to a threshold value for a tiering criterion for the zone the block is in. For example, if a tiering criterion specifies that tiering operations should be performed based on block temperature, the tiering module can detect the temperature for a given block. The tiering information can specify that if a block's temperature is above a certain threshold, the block should be in tier 1. Blocks that are in tier 1 that exceed the temperature for tier 1 do not need to be moved. Blocks in tier 1 that have temperature values below the threshold for tier 1 should be moved to another tier. If the temperature of such a block is such that the block should be moved to tier 2, the tiering module can designate the block as zone 2. If the block should be moved to tier 3, the tiering module can designate the block as zone 3. If a block in tier 2 should be moved to tier 1, the tiering module can designate the block as zone 1. The tiering module can set an attribute value, e.g., a value in a register, indicating the zone for a block.

At 240, the file system can check the attribute for the block to detect whether the block should be moved to a different tier, and if so, to which tier. If a move is needed, the file system can move the block at 250. The file system can instruct a tiering module of the storage array, e.g., tiering module 26, to ignore the move for the purpose of calculating the block's tiering attribute value, e.g., I/O temperature, for tiering operations performed by the storage array's tiering module. The file system detects whether there are more blocks included in the defragmentation operation at 260. If so, the file system selects a next block at 270 and returns to 220. If not, the method ends.

Figure 3:
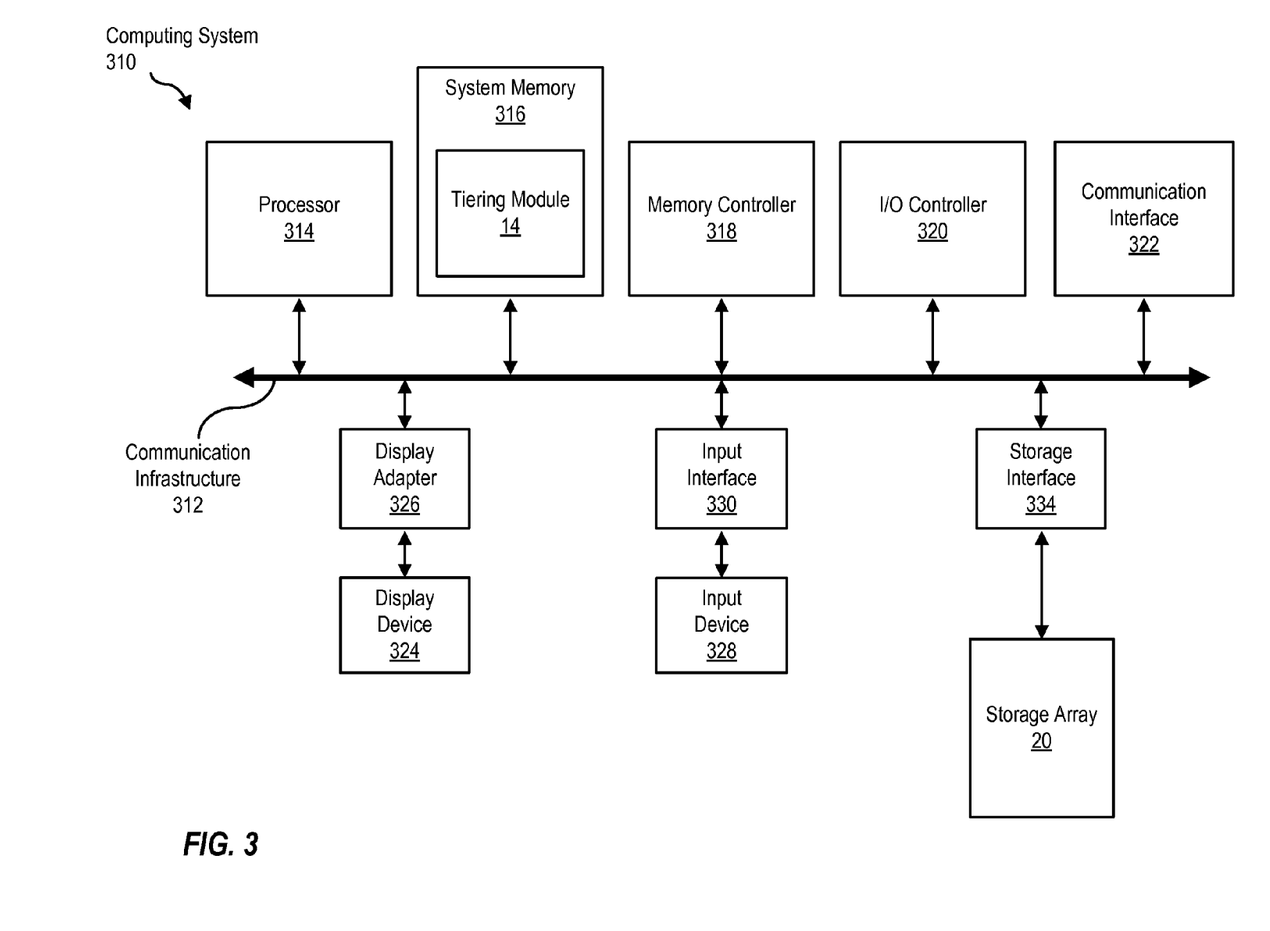
FIG. 3 is a block diagram of a computing device, illustrating how a tiering module can be implemented in software, according to one embodiment of the present invention.

FIG. 3 is a block diagram of a computing system 310 capable of performing defragmentation operations as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a tiering module 14, computing system 310 becomes a special purpose computing device that is configured to perform defragmentation operations in a manner that transforms fragmented data into homogenous chunk sized blocks to facilitate array-based storage tiering.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, storage array 20, as described in detail below). In one example, program instructions executable to implement a tiering module 14 (e.g., as shown in FIG. 1) may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a storage array 20 coupled to communication infrastructure 312 via a storage interface 334. Storage array 20 generally represents any type or form of storage device or medium capable of storing data and/or other computer-readable instructions. For example, storage array 20 may include one or more of a magnetic disk drive (e.g., a so-called hard drive), a floppy disk drive, a magnetic tape drive, an optical disk drive, a flash drive, or the like. Storage interface 334 generally represents any type or form of interface or device for transferring data between storage array 20 and other components of computing system 310. A storage device like storage array 20 can perform tiering operations to implement storage policies established by, for example, an enterprise.

In certain embodiments, storage array 20 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage array 20 may also include other similar structures or devices for allowing computer software, data, or other computer-readable instructions to be loaded into computing system 310. For example, storage array 20 may be configured to read and write software, data, or other computer-readable information. Storage array 20 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
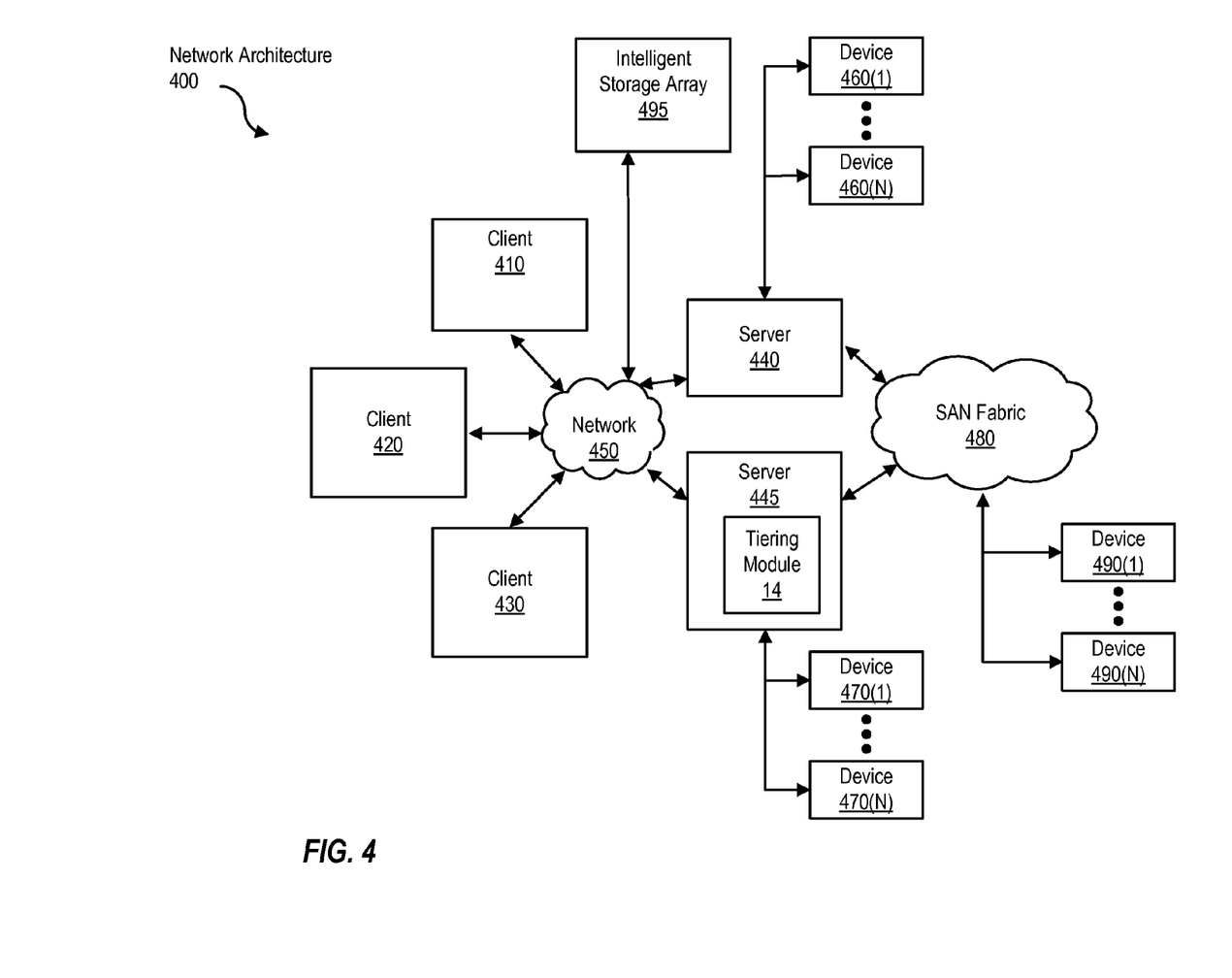
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 3.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include a tiering module 14 as shown in FIG. 1.

As illustrated in FIG. 4, one or more storage devices 460(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. It is noted that intelligent storage array 495 can be connected to servers 440 and 445 by some other medium, such as via network 450. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 4, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a tiering module may transform the behavior of a file system such that a storage array's performance is less negatively impacted due to tiering operation performed by the storage array.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving tiering information from a storage device, wherein
the storage device comprises a plurality of tiers,
the tiering information specifies a tiering attribute and a tiering attribute value for a tier of the plurality of tiers;
establishing a plurality of zones, wherein
a first zone of the plurality of zones comprises a zone attribute value that corresponds to the tiering attribute value;
storing a first block in the first zone in response to detecting that a block attribute value of the first block corresponds to the zone attribute value, wherein
the receiving, the establishing, and the detecting are performed by a computing device that implements an application.

2. The method of claim 1, wherein
the tiering attribute value comprises threshold value.

3. The method of claim 1, further comprising:
in response to detecting that a number of accesses to the first block has passed a threshold value, changing the block attribute value of the first block.

4. The method of claim 1, wherein,
the tiering attribute is related to a priority of data.

5. The method of claim 1, further comprising:
specifying the block attribute value of the first block based on the tiering information.

6. The method of claim 1, further comprising:
detecting that each block of a plurality of blocks in the first zone has an identical block attribute value.

7. The method of claim 1, further comprising:
moving the first block from the first zone to a second zone.

8. The method of claim 1, further comprising:
communicating a command to the storage device, wherein
the command overrides a storage device tiering policy.

9. A computer readable storage medium storing program instructions executable to:
receive tiering information from a storage array, wherein
the storage array comprises a plurality of tiers,
the tiering information specifies a tiering attribute and a tiering attribute value for a tier of the plurality of tiers;
establish a plurality of zones, wherein
a first zone of the plurality of zones comprises a zone attribute value that corresponds to the tiering attribute value;
store a first block in the first zone in response to detecting that a block attribute value of the first block corresponds to the zone attribute value.

10. The computer readable storage medium of claim 9, wherein
the tiering attribute value comprises threshold value.

11. The computer readable storage medium of claim 9, wherein the program instructions are further executable to:
  in response to detecting that a number of accesses to the first block has passed a threshold value, change the block attribute value of the first block.

12. The computer readable storage medium of claim 9, wherein,
  the tiering attribute is related to a priority of data.

13. The computer readable storage medium of claim 9, wherein the program instructions are further executable to:
  specify the block attribute value of the first block based on the tiering information.

14. The computer readable storage medium of claim 9, wherein the program instructions are further executable to:
  detect that each block of a plurality of blocks in the first zone has an identical block attribute value.

15. The computer readable storage medium of claim 9, wherein the program instructions are further executable to:
  move the first block from the first zone to a second zone.

16. The computer readable storage medium of claim 9, wherein the program instructions are further executable to:
  communicate a command to the storage device, wherein the command overrides a storage device tiering policy.

17. A system comprising:
  one or more processors; and
  a memory coupled to the one or more processors, wherein the memory stores program instructions executable by the one or more processors to:
    receive tiering information from a storage array, wherein the storage array comprises a plurality of tiers,
      the tiering information specifies a tiering attribute and a tiering attribute value for a tier of the plurality of tiers;
    establish a plurality of zones, wherein
      a first zone of the plurality of zones comprises a zone attribute value that corresponds to the tiering attribute value;
    store a first block in the first zone in response to detecting that a block attribute value of the first block corresponds to the zone attribute value.

18. The system of claim 17, wherein
  the tiering attribute value comprises threshold value.

19. The system of claim 17, wherein the program instructions are further executable to:
  in response to detecting that a number of accesses to the first block has passed a threshold value, change the block attribute value of the first block.

20. The system of claim 17, wherein,
  the tiering attribute is related to a priority of data.

* * * * *